(12) United States Patent
Wilkerson

(10) Patent No.: US 12,391,102 B2
(45) Date of Patent: Aug. 19, 2025

(54) CAMPER WITH STRUT, LATCHING, HATCH-SECURING AND AWNING SYSTEMS

(71) Applicant: Lee Wilkerson, Stanwood, WA (US)

(72) Inventor: Lee Wilkerson, Stanwood, WA (US)

( * ) Notice: Subject to any disclaimer, the term of this patent is extended or adjusted under 35 U.S.C. 154(b) by 258 days.

(21) Appl. No.: 18/131,645

(22) Filed: Apr. 6, 2023

(65) Prior Publication Data
US 2023/0322148 A1 Oct. 12, 2023

Related U.S. Application Data

(60) Provisional application No. 63/329,060, filed on Apr. 8, 2022.

(51) Int. Cl.
| | | |
|---|---|---|
| B60J 7/16 | (2006.01) | |
| B60P 3/34 | (2006.01) | |
| E04H 15/06 | (2006.01) | |

(52) U.S. Cl.
CPC ........... B60J 7/1657 (2013.01); B60J 7/1621 (2013.01); B60P 3/341 (2013.01); E04H 15/06 (2013.01)

(58) Field of Classification Search
CPC ...... B60P 3/34; B60P 3/36; B60P 3/38; B60P 3/39; B60P 3/341; B60J 7/1621; B60J 7/1657; E04H 15/06; B62D 33/037
USPC .......... 296/159, 160, 165, 173, 174, 100.06, 296/100.07; 135/88.13, 88.14, 88.15, 135/88.16
See application file for complete search history.

(56) References Cited

U.S. PATENT DOCUMENTS

| | | | | |
|---|---|---|---|---|
| 4,533,171 A | * | 8/1985 | Lake ......................... | B60P 3/34 |
| | | | | 296/26.06 |
| 4,659,136 A | * | 4/1987 | Martin ..................... | B60J 7/041 |
| | | | | 296/26.05 |
| 5,957,525 A | * | 9/1999 | Nelson .................... | B60P 3/341 |
| | | | | 296/159 |
| 6,814,387 B2 | * | 11/2004 | Lake ....................... | B60J 7/1621 |
| | | | | 296/100.06 |
| 8,182,020 B2 | * | 5/2012 | Herndon .............. | B62D 35/007 |
| | | | | 296/100.06 |
| 10,596,951 B1 | * | 3/2020 | Williams ............... | B60J 7/1657 |
| 11,130,437 B1 | * | 9/2021 | Tatro ........................ | B60P 3/39 |
| 11,648,869 B2 | * | 5/2023 | Freshour .................. | B60P 3/34 |
| | | | | 296/173 |
| 2019/0202333 A1 | * | 7/2019 | Delgadillo, Jr. ....... | B60J 7/1657 |
| 2021/0293047 A1 | * | 9/2021 | Frederickson .......... | B60P 3/341 |

* cited by examiner

*Primary Examiner* — Amy R Weisberg
*Assistant Examiner* — Denise Lynne Esquivel
(74) *Attorney, Agent, or Firm* — TMB Law; Timothy M. Brown

(57) ABSTRACT

The invention provides a camper having strut system that reinforces the body of the camper without the use of structural elements such as walls or cross-bars at the rear of the camper. The strut system can be used with pop-up or wedge-type campers to provide a camper that is free of any structural elements between the sidewalls at the rear of the camper. By avoiding the use of structural elements between the sidewalls at the rear of the camper, the strut system provides a camper with a rear opening that is structurally sound and free of any obstructions making it easier to enter, exit, load, and unload the camper. The invention also provides a latching system, an awning system, and hatch securing system for use with a camper.

11 Claims, 13 Drawing Sheets

CAMPER WITH STRUT, LATCHING, HATCH-SECURING AND AWNING SYSTEMS

CROSS-REFERENCE TO RELATED APPLICATIONS

This application claims the benefit of provisional application No. 63/329,060 filed Apr. 8, 2022, the entire contents of which are incorporated herein by reference for all purposes.

FIELD OF THE INVENTION

The invention relates to campers for use on vehicles. More particularly, the invention relates to a truck camper having innovative strut, latching, hatch securing and awning systems.

BACKGROUND

A variety of campers are available in the art. Among them are wedge campers and pop-up campers for use on the bed of a truck. Wedge campers and pop-up campers include sidewalls and a roof. With wedge campers, the roof is in a hinged relationship with the sidewalls and front wall of the camper such that the roof is permitted to swing upward to provide the camper with a wedge shape when the camper is in an open configuration. Pop-up campers have a roof that is in a telescoping relationship with the sidewalls and front and rear walls of the camper wherein the roof extends vertically to provide the camper with a height allowing a user to stand up in the camper.

Both wedge and pop-up campers require some form of reinforcement between the sidewalls at the rear of the camper in order to provide the camper with structural strength. Reinforcing these campers is of particular importance as the campers are often used with off-road vehicles over rugged terrain where a camper can provide a user with the only available source of shelter. In traversing rugged terrain, the camper is subjected to significant torsion and thus requires significant structural reinforcement.

The reinforcement of wedge and pop-up campers involves the use of a structural member, such as a cross-bar that traverses the space between the sidewalls at the rear of the camper. Other reinforcement means include a rear wall portion that joins the sidewalls at the top of the camper. All current means of reinforcing the camper create an obstacle to the use of the camper as the rear opening of the camper is obstructed. Thus, a user must duck under, or step over, the reinforcement to enter and exit the camper. The reinforcement can also create a hazard as the user may trip over the reinforcement, or bump their head when entering or exiting the camper. The reinforcement also obstructs the rear view from inside the camper which detracts from a user enjoying the surrounding scenery. In addition, the reinforcement hinders the loading and unloading of the camper.

What is needed in the art therefore is a reinforced camper that has an open, unobstructed rear entry.

SUMMARY OF THE INVENTION

The invention provides a camper having a strut system that reinforces the camper while avoiding the use of structural members that create an obstruction at the rear of the camper.

The invention also provides a camper having an innovative latching system that permits a user to access a tailgate latch when the camper is installed on a truck.

The invention also provides a camper having an innovative awning system that permits a rear portion of a tent in the camper to serve as both a tent wall and an awning.

The invention also provides a camper having an innovative hatch securing system that uses the tailgate of a truck the secure the hatch of the camper in a closed configuration when the camper is installed on the bed of the truck.

Figure 1:
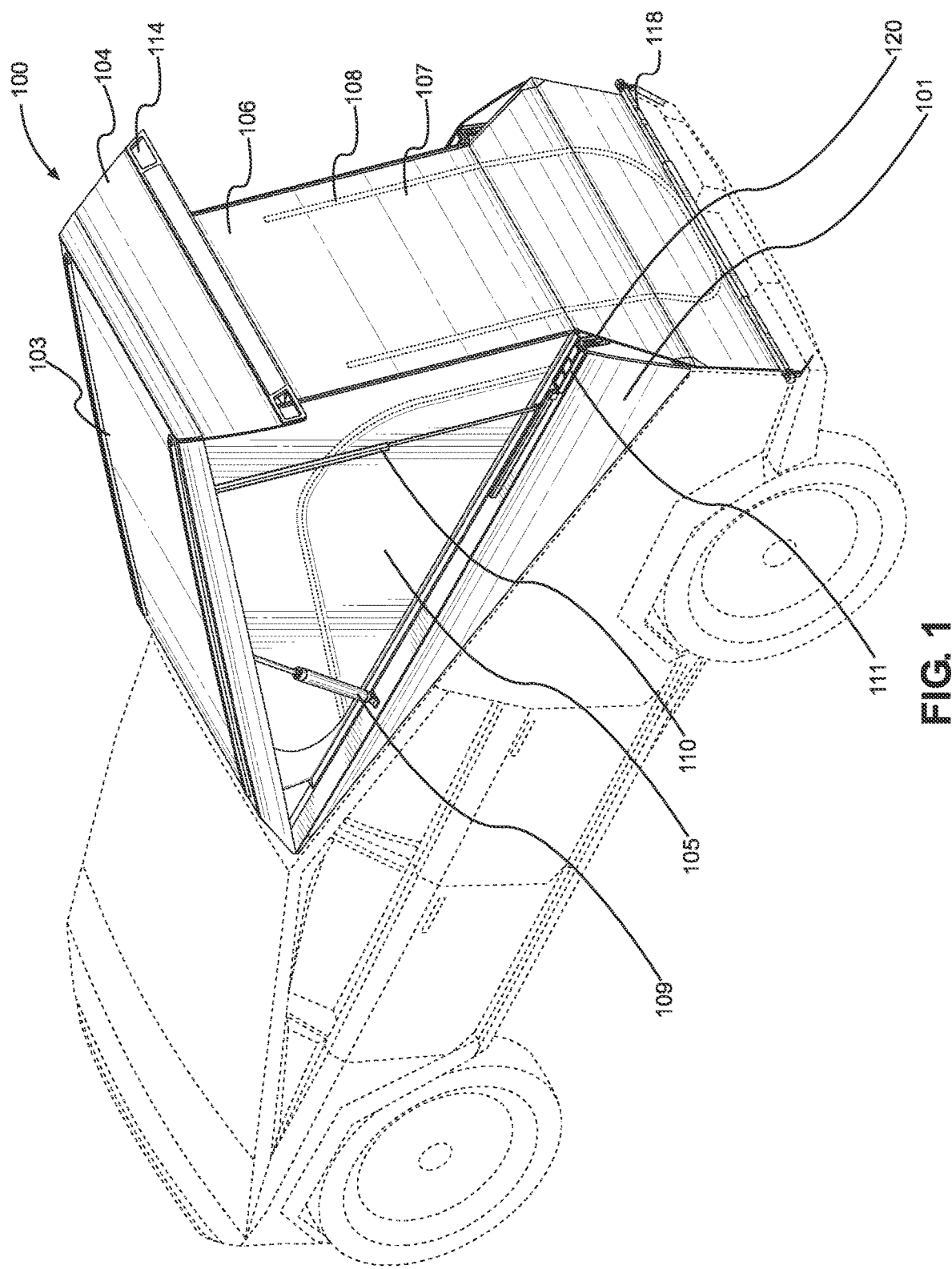
FIG. 1 is a perspective view of an embodiment of the inventive camper in an open configuration, wherein the camper is connected to the bed of a truck and the tent of the camper is closed and the awning system is disengaged.

The figures referred to above are not necessarily drawn to scale and should be understood to present a representation of the invention, illustrative of the principles involved. Some features depicted in the drawings have been enlarged or distorted relative to others to facilitate explanation and understanding. The same reference numbers are used in the drawings for similar or identical components and features shown in various alternative embodiments. The invention, as disclosed herein, will have configurations and components determined, in part, by the intended application and environment in which they are used.

DETAILED DESCRIPTION

The inventor discovered a novel camper that is structurally rigid without any intervening structural members between the sidewalls at the rear of the camper. The inventive camper can use a strut system that reinforces the body of the camper when the roof of the camper is closed. The strut system permits the camper to remain structurally sound while the camper is secured to a truck bed during travel, including travel over rugged terrain such as in off-road applications.

FIG. 1 depicts an embodiment of the inventive camper in an open configuration. Camper 100 comprises a pair of opposing sidewalls 101 connected to roof 103 by one or more hinges. Camper 100 can comprise front wall 102 located opposite the rear of the camper. Sidewalls 101 can be joined to one another by front wall 102. Front wall 102 can be connected to roof 103 by at least one hinge. Connecting roof 103 to sidewalls 101 and/or front wall 102 by one or more hinges permits roof 103 to swing upward thereby allowing camper 100 to alternate between an open and closed configuration. Camper 100 can be interpreted as having a camper body that includes sidewalls 101, front wall 102, and roof 103. The camper body can be made from a material, including, without limitation, epoxy, a metal alloy or metal (e.g. aluminum or steel), fiberglass, carbon fiber, or combinations thereof. In one non-limiting embodiment, the camper body is made from carbon fiber and the outer surface of the camper body has attached thereto a skin of stainless steel.

Roof 103 is connected to hatch 104 by at least one hinge that is adapted to permit hatch 104 to open and close. Camper 100 can have tent 105 connected to sidewalls 101 and roof 103. Tent 105 can include panel 106 at the rear of camper 100. Sidewalls 101, front wall 102, roof 103, tent 105, panel 106, and the bed of the truck upon which camper 100 is installed, define a tent space within camper 100 which can provide an enclosed shelter. Panel 106 can include panel door 107 which can be opened and closed to provide entry and exit into the tent space within camper 100. Panel door 107 is adapted to be opened and closed by closure 108. Some non-limiting examples of closures for closure 108 include, but are not limited to, zippers, buttons, Velcro™, magnets, and combinations thereof. Tent 105, panel 106 and panel door 107 can be made of a fabric or other pliable sheet material that collapses when camper 100 is placed in a closed configuration. FIG. 1 depicts camper 100 in an open configuration, with panel 106 and panel door 107 in a closed configuration.

Figure 15:
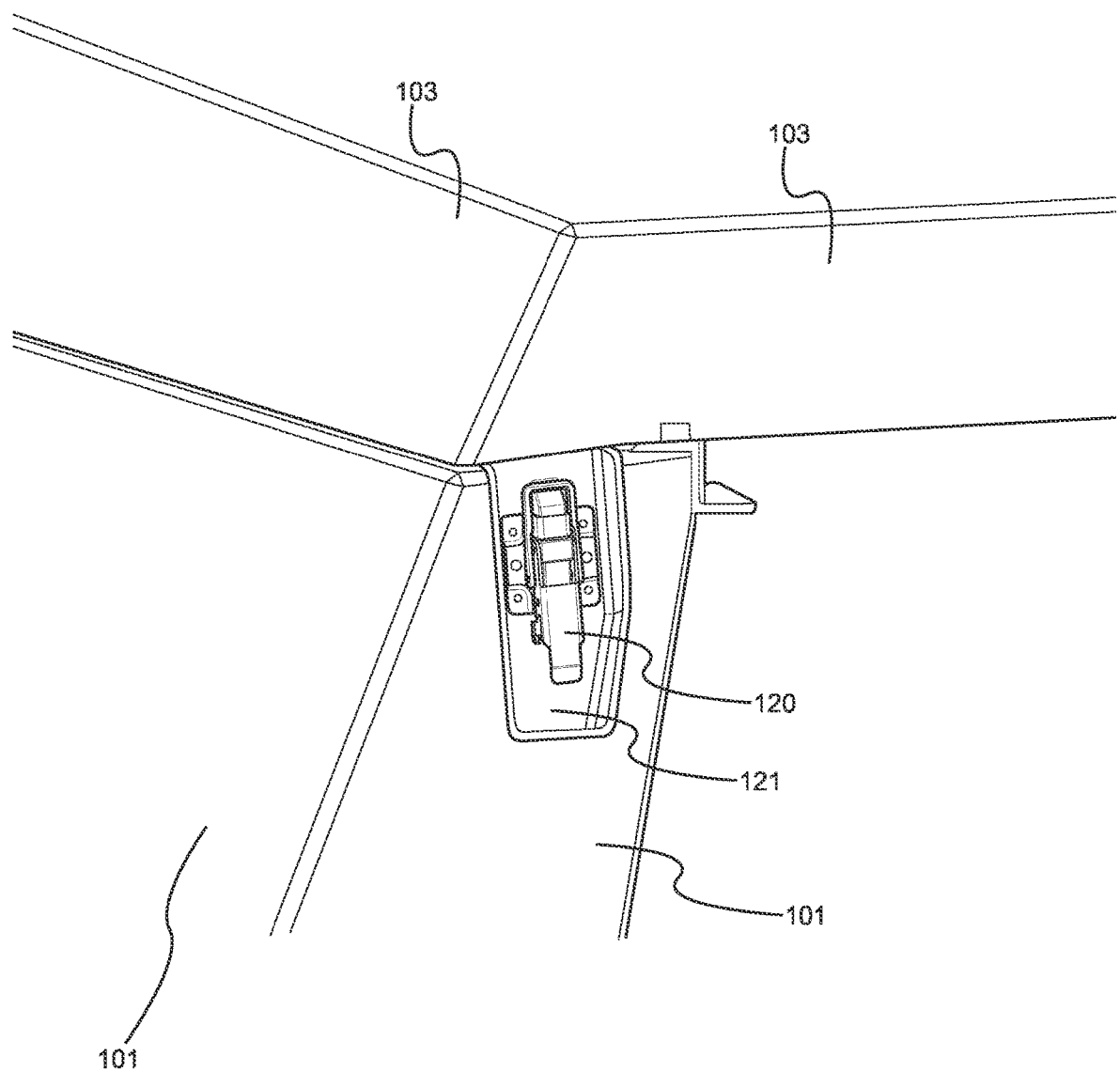
FIG. 15 is a drawing of an embodiment of a roof latch of the invention.

Camper 100 can include a pair of opposing roof latches 120 that are adapted to secure roof 103 to sidewalls 101 to maintain camper 100 in a closed configuration. Roof latches 120 can be any latch configuration suitable for securing roof 103 in a closed configuration. For example, and by no way of limitation, roof latches 120 can be cam latches, baling latches, toggle latches, locking over center cam latches, or combinations thereof. FIG. 15 shows a non-limiting embodiment of roof latch 120 connected to latch surface 121 at the rear end of sidewall 101. Roof latch 120 can be connected to latch surface 121 by rivets, bolts, or screws, for example. Latch surface 121 can be countersunk below the plane of the surface of sidewall 101 at a depth that is sufficient to permit the top of roof latch 120 to be flush with, or below, the plane of the surface of sidewall 101. This configuration can prevent roof latch 120 from contacting the inside surface of hatch 104 when hatch 104 is closed against the rear end of sidewall 101 thereby allowing the inner surface of hatch 104 to be flush against the outside surface of the rear of sidewall 101. When hatch 104 is closed, hatch 104 prevents access to roof latches 120 so that roof 103 cannot be opened without opening hatch 104.

Camper 100 can include a pair of rams 109 positioned near the front of, and on opposing sides of, camper 100. Rams 109 are pivotably connected to sidewalls 101 and roof 103. Rams 109 are adapted to provide upward force to assist a user in raising roof 103 to place camper 100 in an open configuration. Rams 109 can be pneumatic or hydraulic rams. Camper 100 includes lockout bars 110 near the rear, and on opposing sides of, camper 100. Lockout bars 110 are adapted to support roof 103 so as to fix camper 100 in an open configuration. Lockout bars 110 can be lockable telescoping rods, for example. Lockout bars 110 are connectable to the bottom surface of roof 103 and the top of sidewalls 101. Lockout bars 110 can be pivotably connected to the top of sidewalls 101, wherein lockout bars 110 are permitted to lay against sidewalls 101 when lockout bars 110 are not connected to roof 103. Lockout bars 110 can connect to roof 103 in a reversible mating relationship so as to permit lockout bars 110 to be quickly disconnected from roof 103 and placed horizontally against sidewalls 101. The tops of sidewalls 101 can include a trough or depression for receiving lockout bars 110 so that lockout bars 110 do not contact or interfere with the closing of roof 103 against the tops of sidewalls 101.

Figure 2:
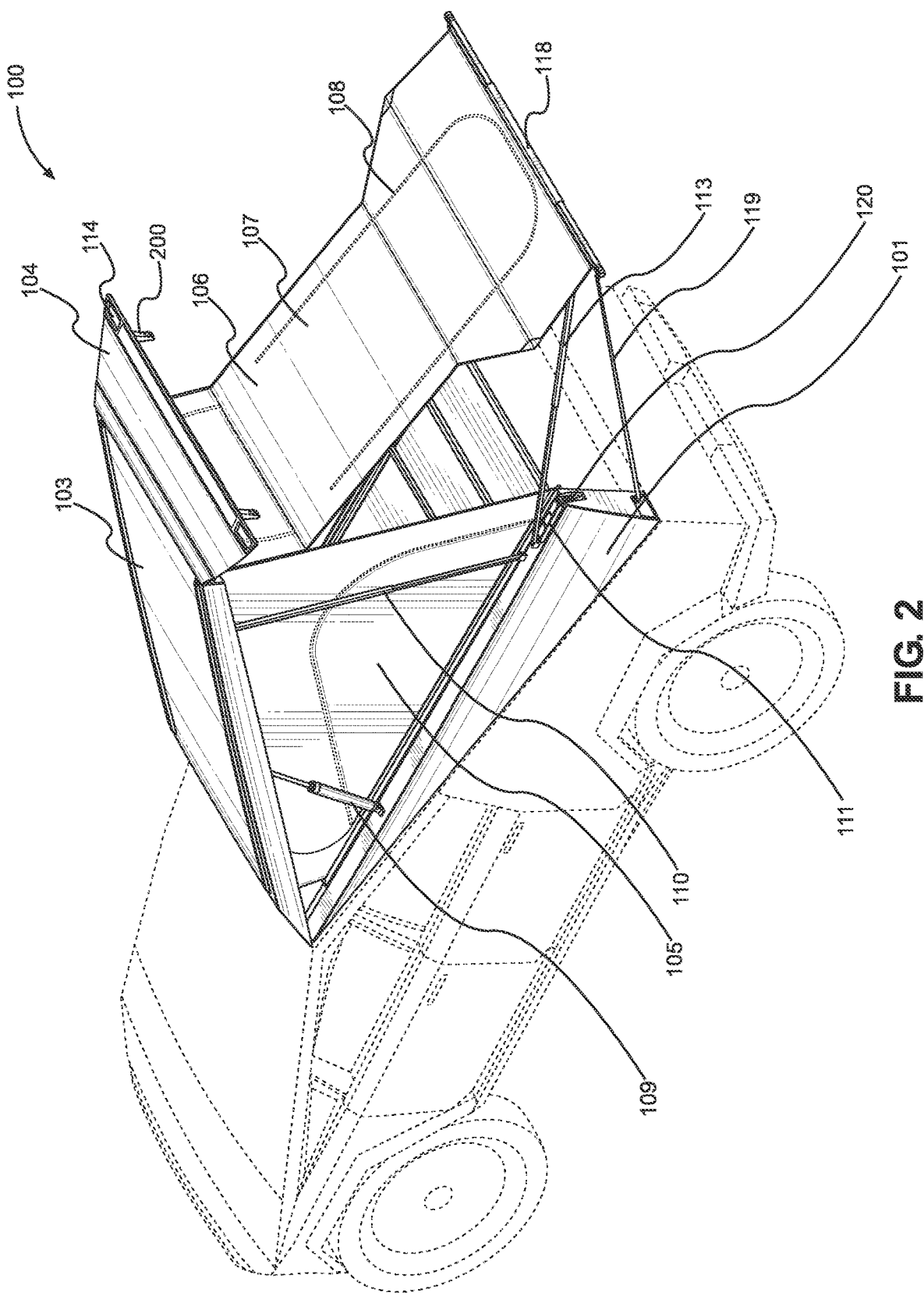
FIG. 2 is a perspective view of an embodiment of the inventive camper in an open configuration, wherein the camper is connected to the bed of a truck and tent of the camper is open and the awning system is engaged.

FIG. 2 shows camper 100 and panel 106 in an open configuration with panel 106 forming part of an awning system. The awning system can provide shelter against rain, snow and sun, for example, while permitting the rear of the camper to remain open. The awning system can include panel 106, a pair of opposing linear members 113, bottom support 118, and a pair of opposing retention members 119. Linear members 113 are rigid members that are adapted to support and maintain panel 106 in an open configuration. Linear members 113 can be connected to sidewalls 101 by hinges so as to permit linear members 113 to rotate towards the front of camper 100 and lay against the top of sidewalls 101 for storage when panel 106 is closed and the awning system is disengaged. Bottom support 118 is a rigid linear member and can be made from a material such as fiberglass, aluminum, or plastic, for example. Bottom support 118 is adapted to reversibly connect to linear members 113 when the awning system is engaged. Linear members 113 can reversibly connect to bottom support 118 on panel 106 by spring-loaded pins or a magnetic connection, for example. Linear members 113 can be telescoping rods that are lockable to permit linear members 113 to extended to a length that keeps panel 106 taught and straight when linear members 113 are connected to sidewalls 101 and bottom support 118 while panel 106 is open and the awning system is engaged. Alternatively, linear members 113 can have a fixed length suitable for keeping panel 106 taught and straight when linear members 113 are connected to sidewalls 101 and bottom support 118 while panel 106 is open and the awning system is engaged. With the panel 106 open and linear members 113 in rigid connection with sidewalls 101 and bottom support 118, retention members 119 connect to bottom support 118 and the rear surfaces of sidewalls 101 under tension so as to provide structural strength to the awning system. Retention members 119 can be elongated elastomeric members made from rubber or silicone for example. Alternatively, retention members 119 can be straps made of a material such as nylon and in operable connection with a ratchet so as to be adapted to connect to bottom support 118 and the rear surfaces of sidewalls 101 under tension.

When panel 106 is in a closed configuration and the awning system is disengaged, panel 106 connects to tent 105 by a zipper or Velcro™, for example, while sidewalls 101 reversibly connect to panel 106 by magnets, Velcro™, snaps or zippers, for example.

In some aspects of the invention, camper 100 includes a strut system for reinforcing camper 100 against torsion forces during travel while camper 100 is in a closed configuration and attached to a vehicle, such as on the bed of a truck. The inventive strut system reinforces camper 100 and avoids the use of structural members such as a cross-bar or a wall portion between opposing sidewalls 101 at the rear of camper 100. Thus, the strut system of the invention provides a camper with a rear entry that is completely open and free of any obstructions. This permits a user to enter and exit camper 100, and to load and unload camper 100, without having to navigate any obstruction. This can be particularly advantageous at night, or when a user is carrying a load that could obstruct the user's ability to see and avoid an obstruction while entering or exiting the camper. Moreover, the inventive strut system provides camper 100 with a completely open space so that the rear view into and out of the camper is unobstructed. This provides a particular advantage as campers are often used and enjoyed in scenic locations. In some embodiments, the strut system of the invention is used with a wedge camper. The wedge camper can have sidewalls 101 with a profile that tapers towards the front of the camper such that the sidewalls have a triangular shape. Alternatively, camper 100 can have sidewalls with a straight profile such that the sidewalls have a rectangular shape.

The strut system can include one or more interfacing structural elements on sidewalls 101 and roof 103 that mate with one another when camper 100 is in a closed configuration. By mating with one another, the structural elements lock together and permit sidewalls 101, front wall 102, and roof 103 to resist torsion forces while camper 100 is transported to a location on a vehicle, such as on a truck during off-road travel. The strut system can include structural elements 111 on a top surface of sidewalls 101 at or near the rear of camper 100, and structural elements 112 on a bottom surface of roof 103 at or near the rear of camper 100. When camper 100 is in a closed configuration, structural elements 111 interface with structural elements 112 in a mating relationship that allows camper 100 to avoid torsion forces that would otherwise contort and damage a camper that lacks any structural member or wall portion between the sidewalls at the rear of the camper.

Figure 4:
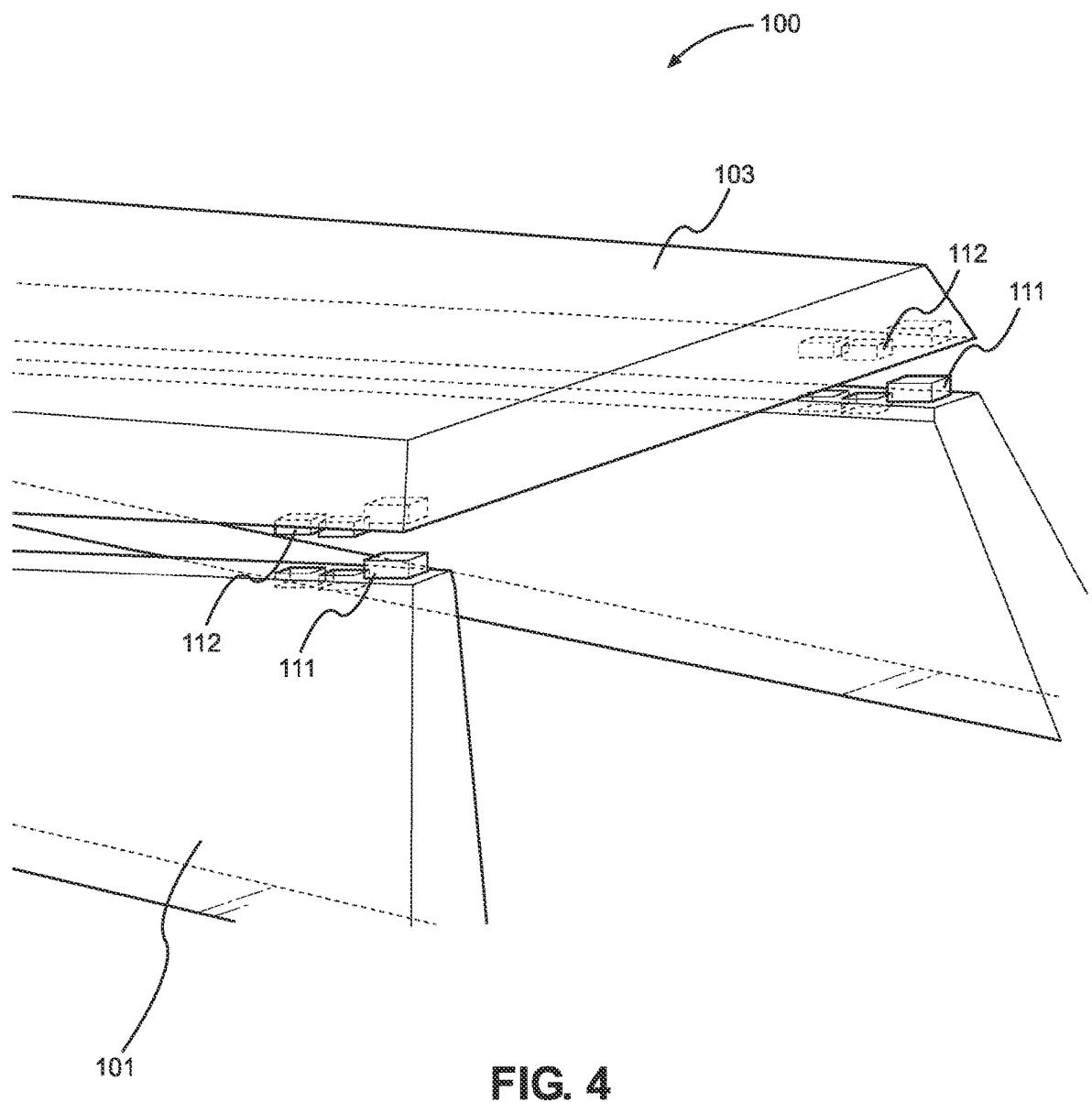
FIG. 4 is a drawing of an embodiment of the strut system of the invention with the roof of the camper in a partially open configuration.
Figure 5:
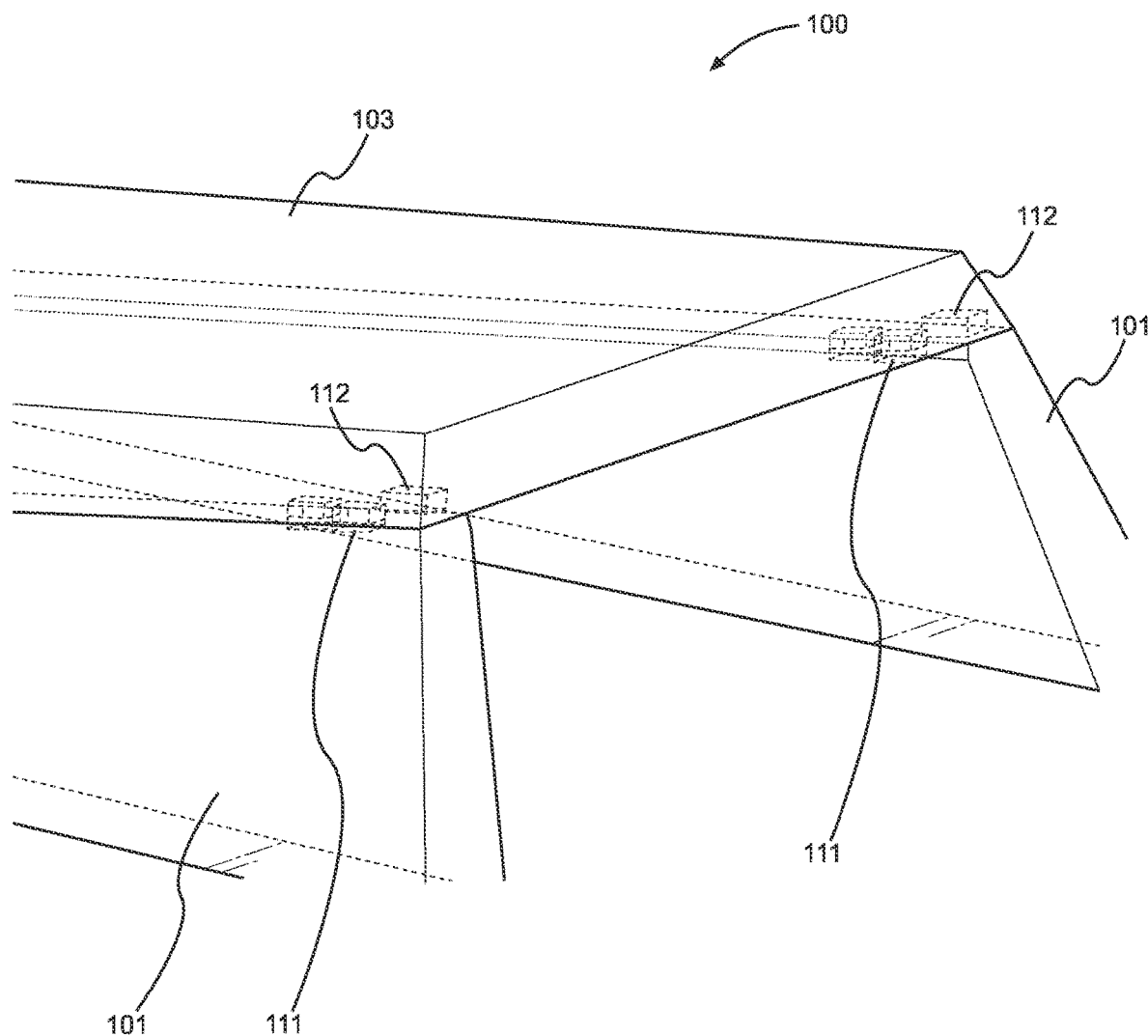
FIG. 5 is a drawing of an embodiment of the strut system of the invention with the roof of the camper in a closed configuration.
Figure 6:
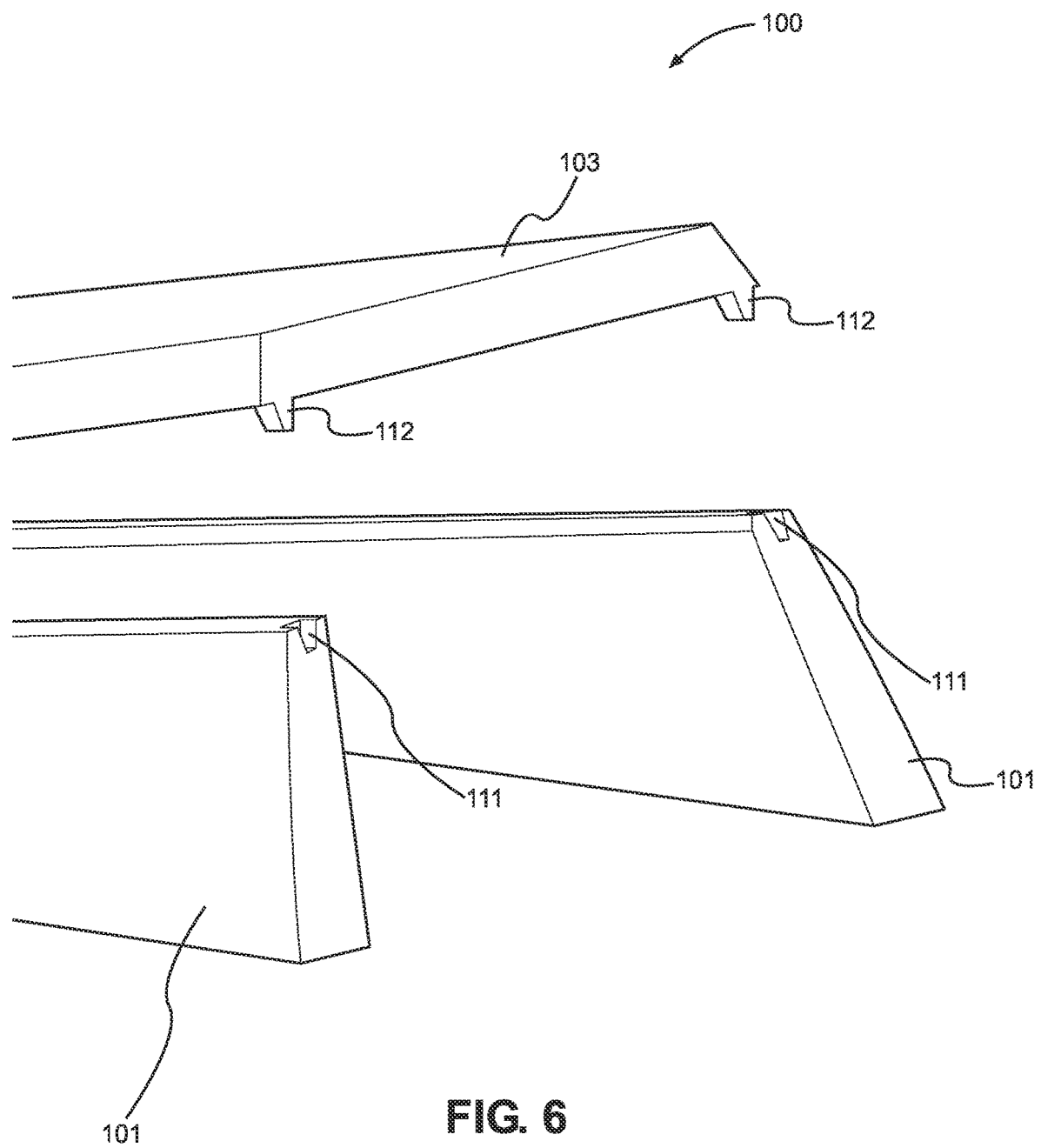
FIG. 6 is a drawing of an embodiment of the strut system of the invention with the roof of the camper in a partially open configuration.
Figure 7:
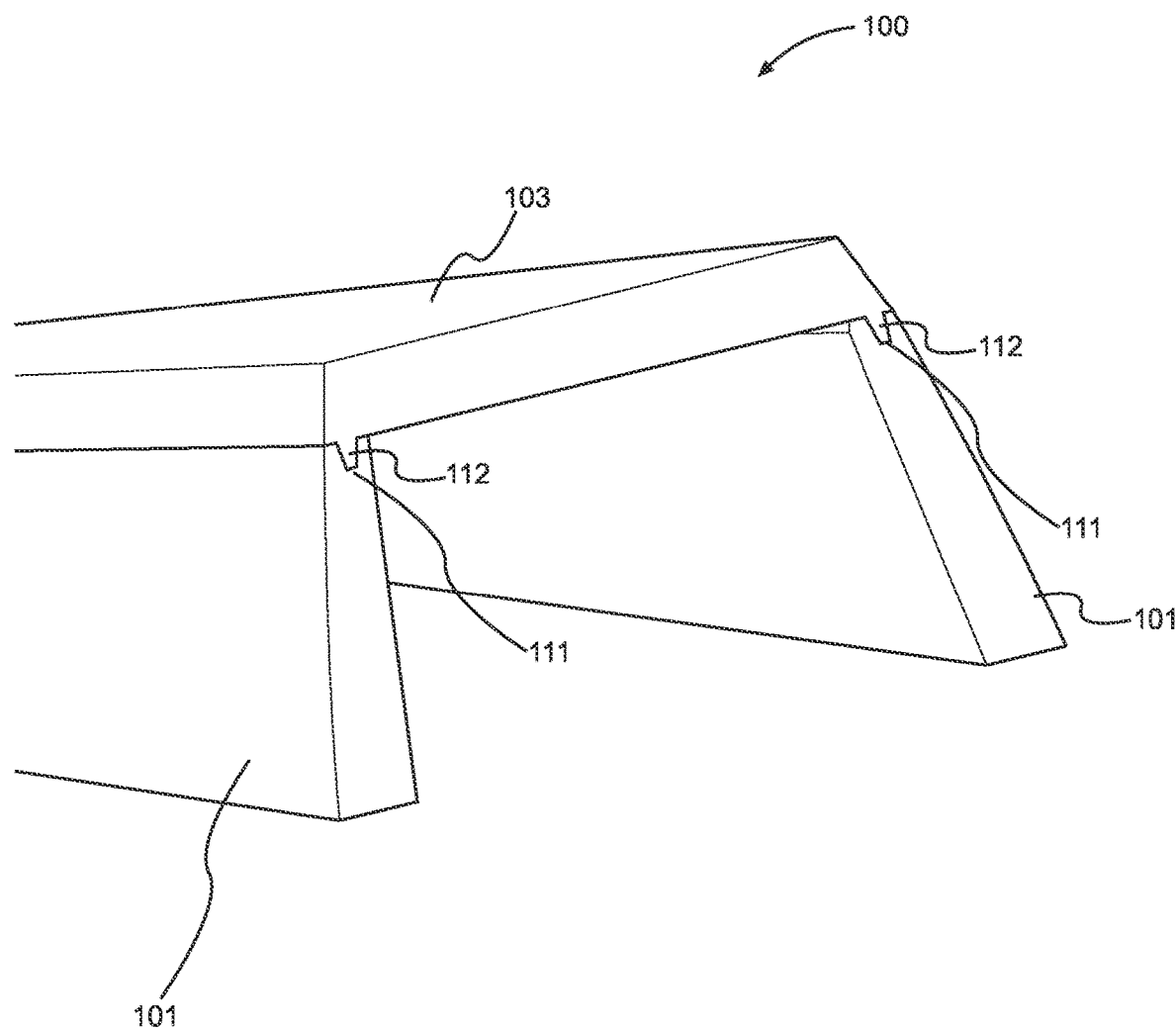
FIG. 7 is a drawing of an embodiment of the strut system of the invention with the roof of the camper in a closed configuration.

FIGS. 4 and 5 depict an embodiment of the strut system of the invention wherein structural elements 111 comprise a series of protrusions and indentations that are adapted to mate with structural elements 112 which comprise an opposing series of complimentary protrusions and indentations. Structural elements 111 can comprise one or more protrusions that rise above the plane of the top sidewalls 101, and/or one or more indentations that extend below the plane of the top of sidewalls 101. Structural elements 112 can comprise one or more protrusions that extend below the plane of the bottom of roof 103, and/or one or more indentations that rise above the plane of the bottom of roof 103. While structural elements 111 and structural elements 112 are depicted as having a square cross-section, it will be appreciated that structural elements 111 and structural elements 112 can assume any complimentary cross-sectional shape or configuration that permits the structural elements to mate with one another in a manner that provides strength and rigidity to camper 100 when roof 103 is closed and in contact with sidewalls 101. For example, structural elements 111 and structural elements 112 can assume a cross-sectional shape that is round, oval, square, rectangular, triangular, or a combination thereof. Structural elements 111 and structural elements 112 can include one or a plurality of complimentary male and female mating elements. For example, FIGS. 6 and 7 show an embodiment for a strut system wherein structural elements 111 comprise a triangular indentation and structural elements 112 comprise a complimentary triangular protrusion. Structural elements 111 and structural elements 112 can comprise a complimentary rail and track configuration that extends along at least a portion of the top of sidewalls 101 and the bottom of roof 103.

Figure 3:
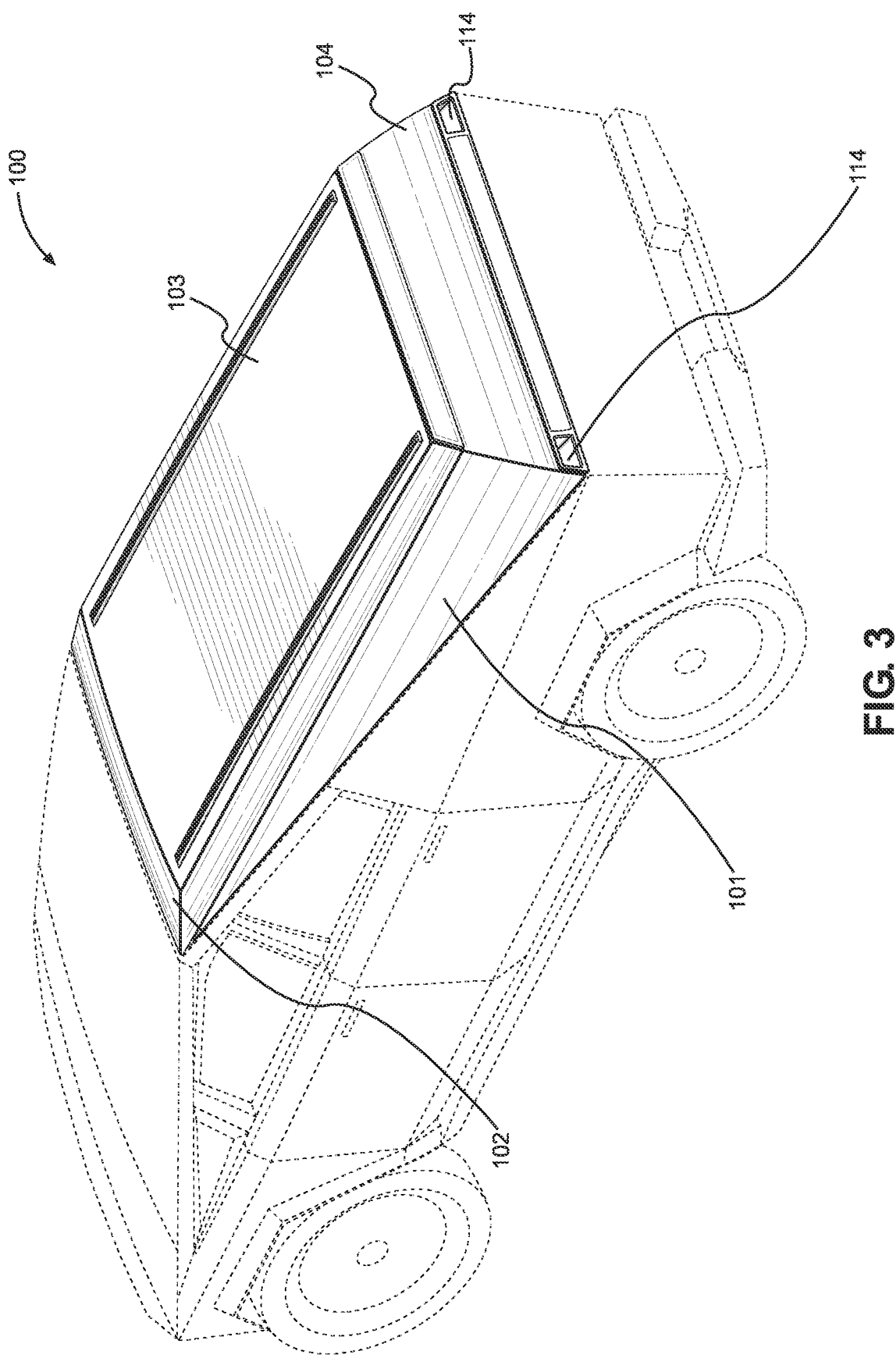
FIG. 3 is a perspective view of an embodiment of the inventive camper in a closed configuration.

FIGS. 6 and 7 also show that the inventive strut system permits camper 100 to be free of any structural member or wall portion between sidewalls 101. While hatch 104 is not shown in FIG. 6 or 7, it will be appreciated that hatch 104 is of a size and configuration that is sufficient to cover the rear of camper 100. In a preferred embodiment, hatch 104 is of sufficient width to cover the rear ends of sidewalls 101 so that the edges of hatch 104 are flush with the outside surface of sidewalls 101 when hatch 104 is closed, such as shown in FIG. 3.

Figure 8:
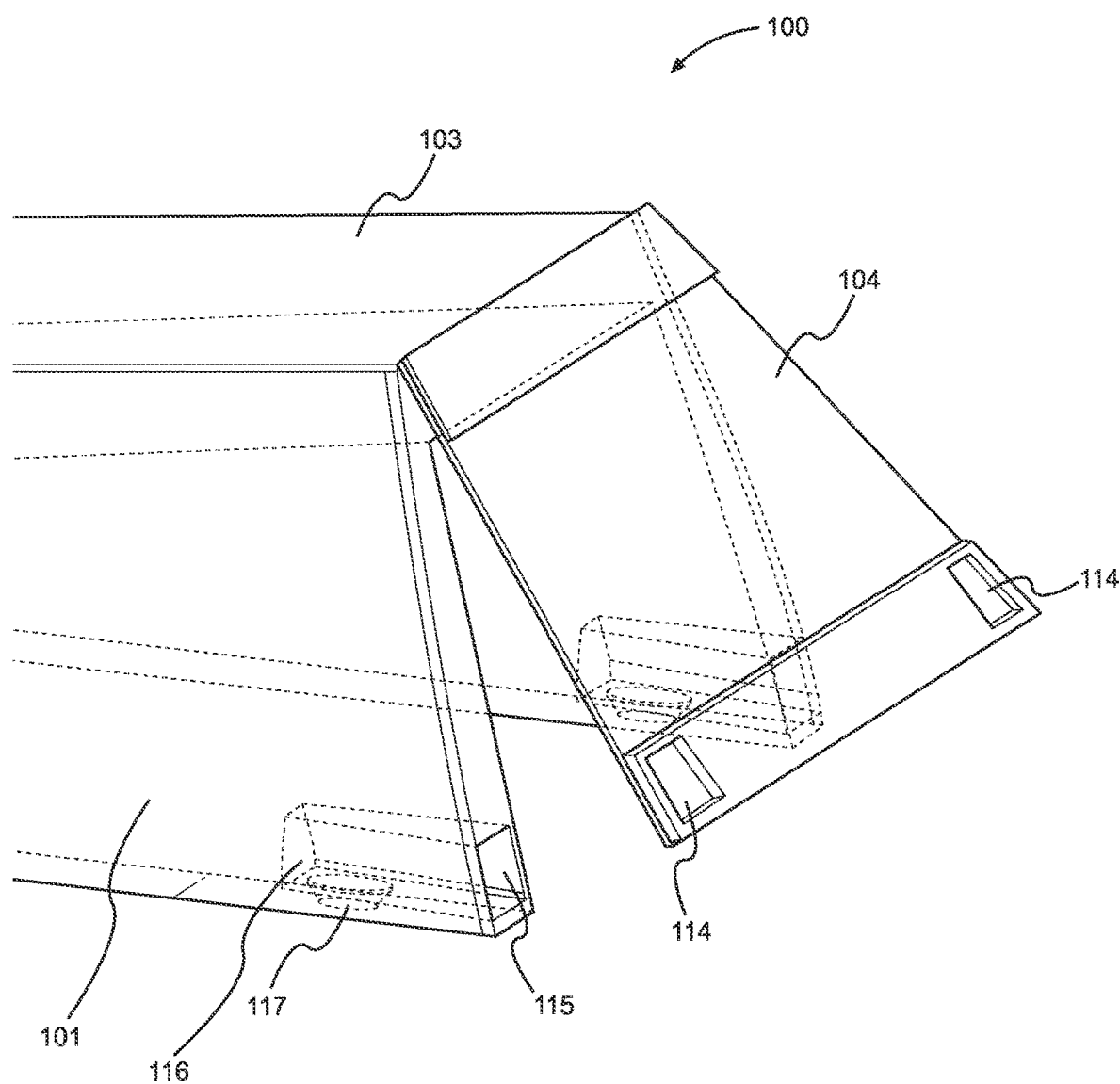
FIG. 8 is a drawing of a first embodiment of the latching system of the invention with the hatch of the camper in a partially open configuration.
Figure 9:
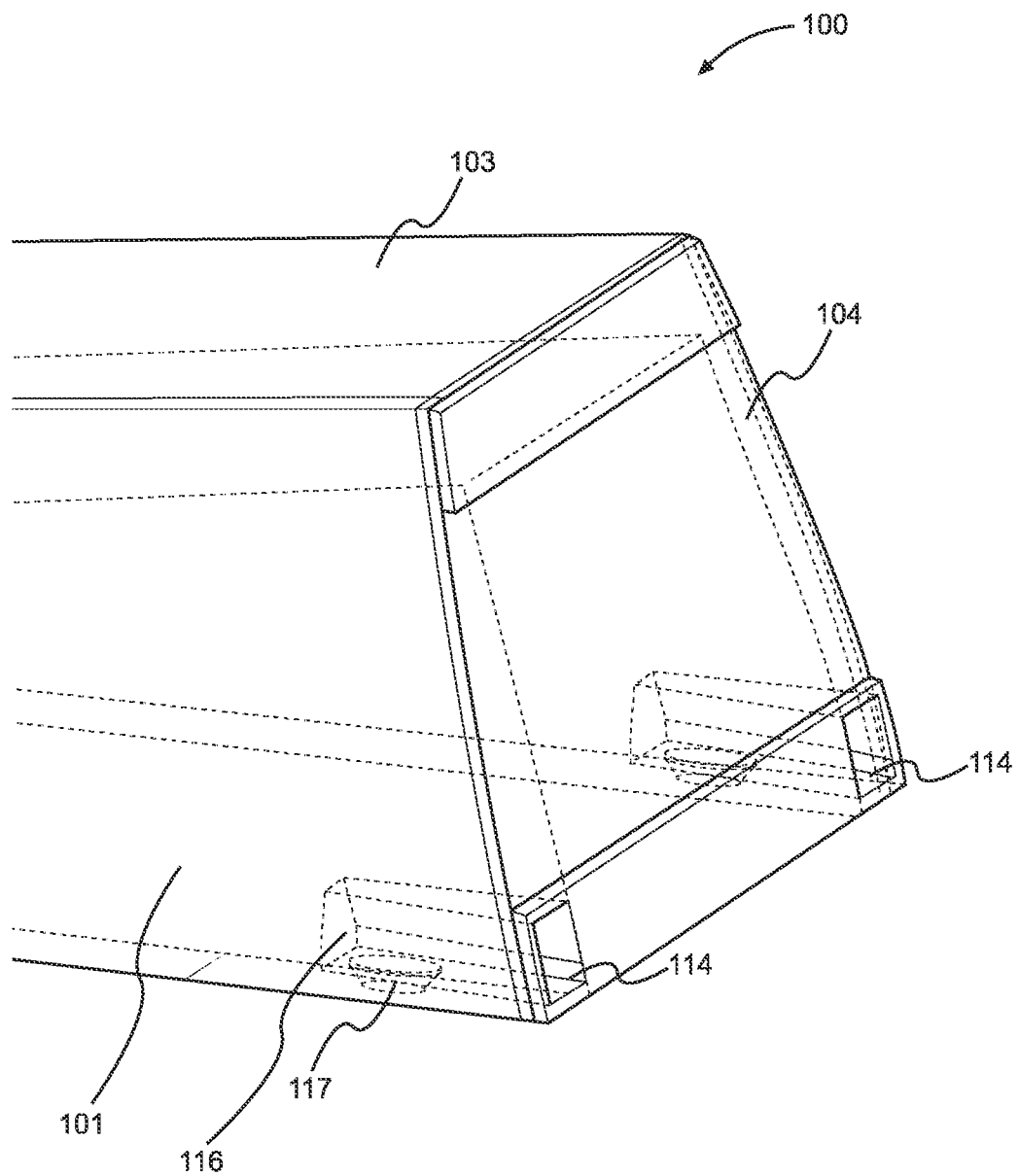
FIG. 9 is a drawing of the latching system of FIG. 8 with the hatch of the camper in a closed configuration.

Another aspect of the invention provides a latching system for a camper. FIGS. 8 and 9 show a first non-limiting embodiment of the latching system of the invention. In this embodiment, the latching system can comprise hatch openings 114 which traverse hatch 104 and align with sidewall openings 115 when hatch 104 is in a closed configuration, such as shown in FIG. 9. Hatch openings 114 and sidewall openings 115 provide access to latch columns 116. Latch columns 116 are hollow spaces within sidewalls 101 that are adapted to permit a user to reach into sidewalls 101 and activate tailgate mechanism 117 thereby unlatching a tailgate on a truck to which camper 100 is attached. Latch columns 116 can have the same cross-sectional shape as hatch openings 114 and sidewall openings 115. Tailgate mechanisms 117 can be latches or electronic switches, for example. In some embodiments, tailgate mechanisms 117 are integrated into the construction of camper 100. For example, tailgate mechanisms 117 can be electronic switches that are integrated into the construction of sidewall sidewalls 101 and wired into the electronic controls of the truck to which the camper is attached so as to permit tailgate mechanisms 117 to operate the truck's electronic tailgate latching mechanism. Alternatively, tailgate mechanisms 117 can be integrated into the construction of the upper bed rails of a truck on which the camper is installed, wherein latch columns 116 have openings in their bottom surfaces to permit a user to access and activate tailgate mechanisms 117 so as to release the tailgate of the truck.

The latching system of the invention provides access to a mechanism for opening the tailgate of a truck while protecting the mechanism from collisions and the elements, such rain and snow. This provides a particular advantage when the mechanism is an electric switch which can be especially susceptible to collisions and the elements. In addition, hatch openings 114, sidewall openings 115, and latch columns 116 can be adapted to receive a foot of a human and serve as a step to permit a human to reach roof 103, such as for loading a rack or storage compartment on roof 103. While FIGS. 8 and 9 depict a pair of latching systems, it will be appreciated that camper 100 can have a single latching system.

Figure 10:
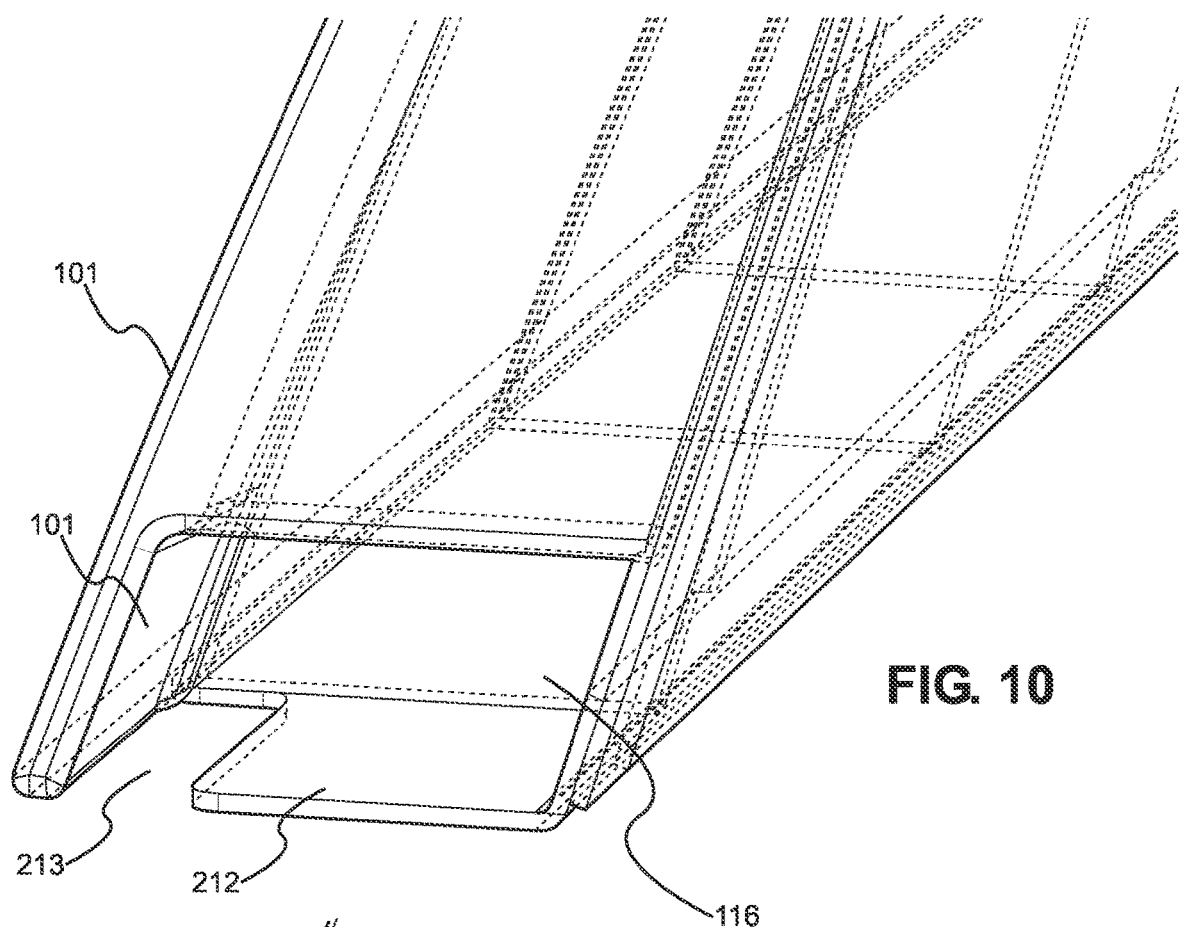
FIG. 10 is a drawing of a second embodiment the latching system of the invention with the hatch of the camper in an open configuration.
Figure 11:
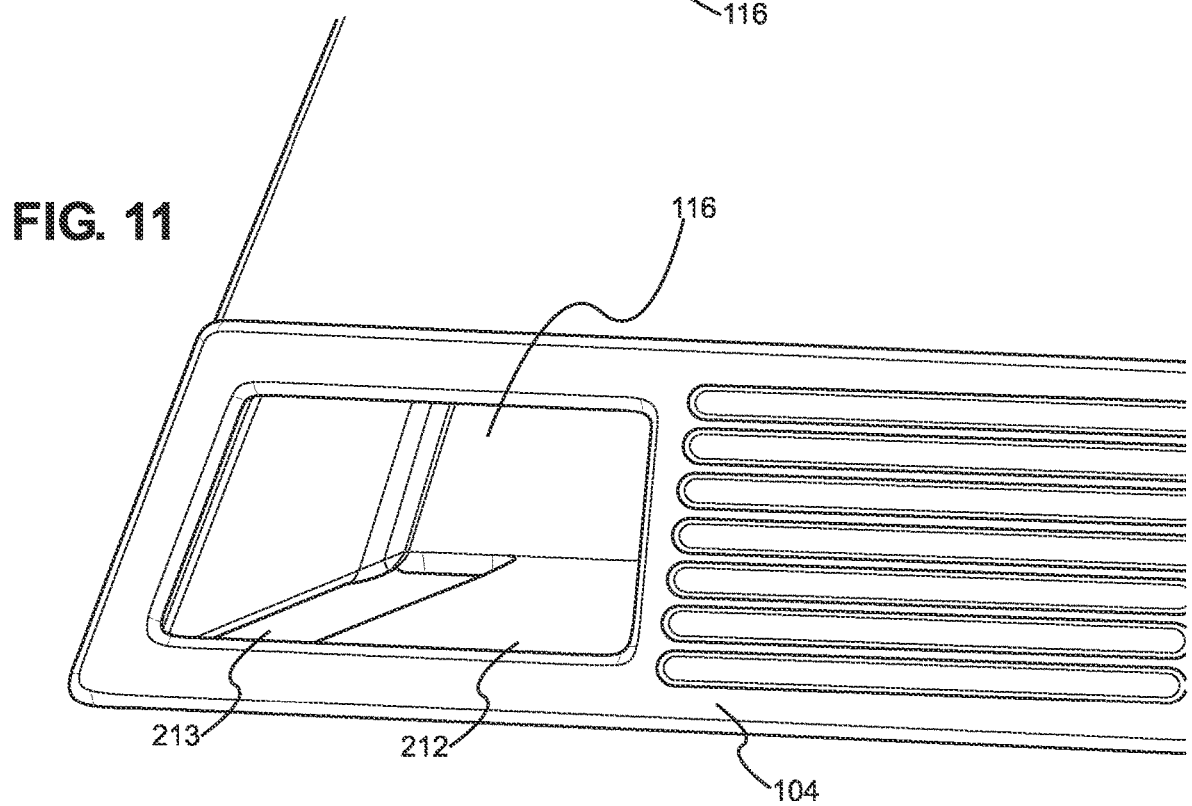
FIG. 11 is a drawing of the latching system of FIG. 10 with the hatch of the camper in a closed configuration.

FIGS. 10 and 11 depict a second embodiment of the latching system of the invention. This embodiment shows that latch column 116 can have a truncated length compared to the latch columns of FIGS. 8 and 9. The latching system in this second embodiment can have column floorplate 212 which forms a bottom surface of latch column 116. Floorplate 212 can be an extension of the bottom surface of sidewalls 101. Column floorplate 212 can have floorplate opening 213 which forms an aperture in the bottom of latch column 116 and is adapted to permit a user to access a latching mechanism on the bedrails of a truck upon which the camper is installed.

FIG. 10 shows the second embodiment of the latching system with hatch 104 in a closed configuration. As in the first embodiment of the latching system, the openings in sidewall 101 and hatch 104 align to permit a user to access the space formed by latch column 116. In this second embodiment, a user can access and operate a tailgate mechanism of a truck on which the camper is attached through floorplate opening 213. While FIGS. 8-11 show hatch openings 116 having a bottom surface that can be formed by an extension of the bottom of sidewalls 101, it will be appreciated that latch column 116 can be a space that does not have a floorplate. That is, the entire bottom of latch column 116 can be open such that the bottom opening is defined by the opposing inner and outer walls of sidewalls 101 and the portion of sidewall 101 where the latch column terminates towards the front of the camper.

Figure 12:
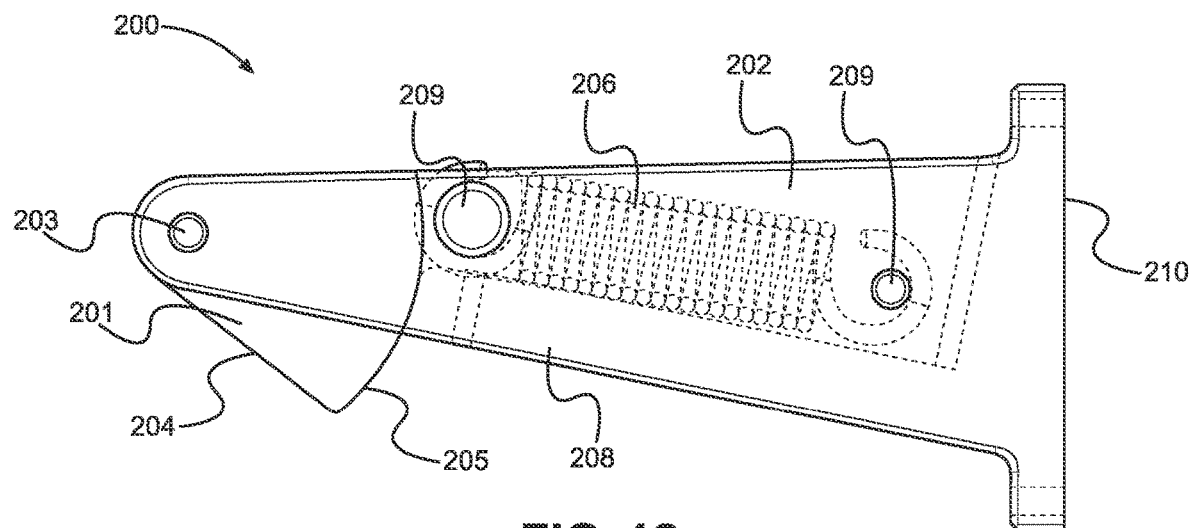
FIG. 12 is a side view of an embodiment of the hatch securing system of the invention with the latch in a locking configuration.
Figure 13:
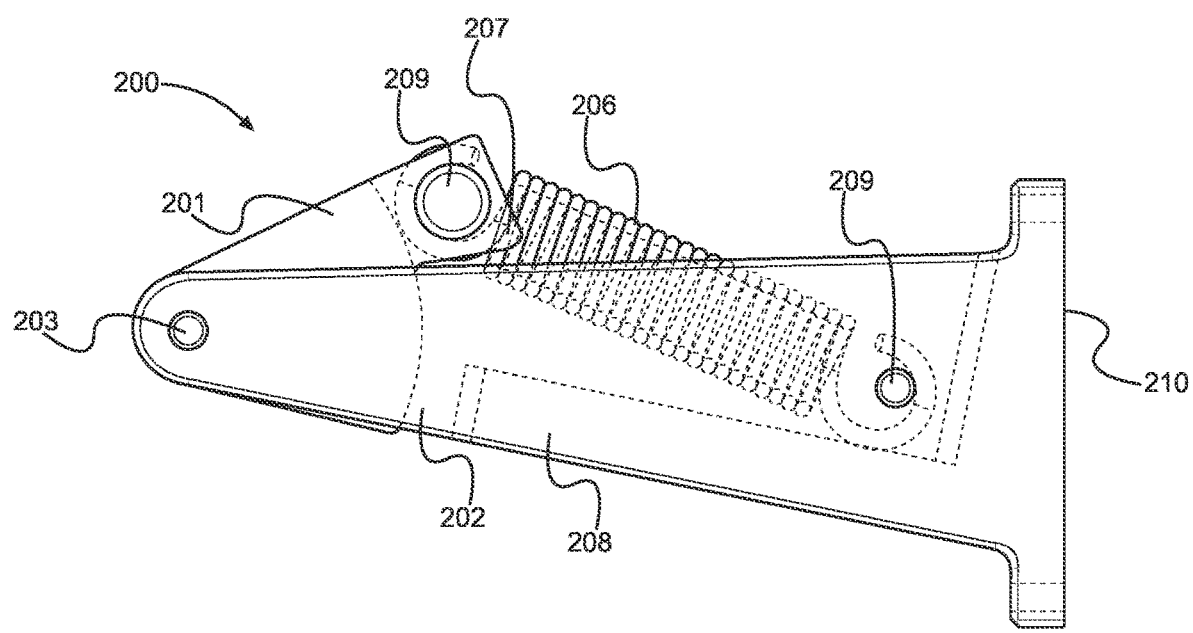
FIG. 13 is a side view of an embodiment of the hatch securing system of the invention with the latch in a retracted configuration.
Figure 14:
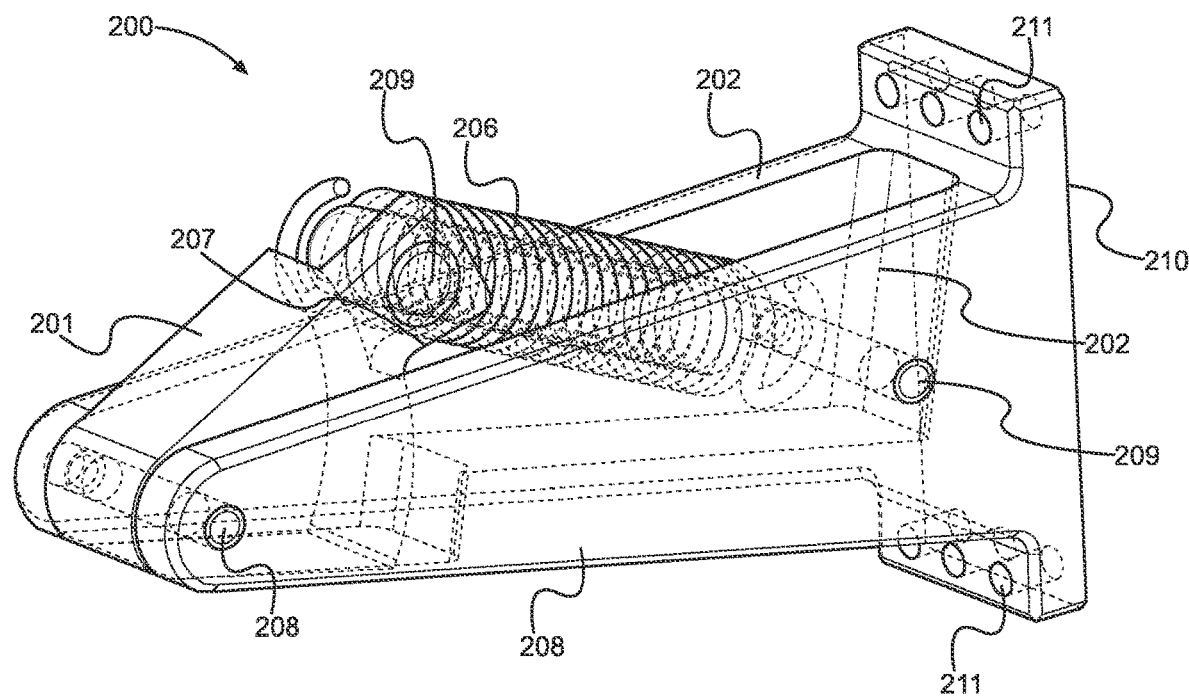
FIG. 14 is a perspective view of an embodiment of the hatch securing system of the invention with the latch in a retracted configuration.

Another aspect of the invention provides a hatch securing system for a camper. The hatch securing system can comprise at least one latch connected to hatch 104, wherein the latch is adapted to interface with the tailgate of a truck to secure hatch 104 of camper 100 in a closed configuration when the camper is connected to a truck and the tailgate of the truck is closed. FIGS. 12-14 depict an embodiment of a latch for use with the hatch securing system of the invention. Latch 200 can comprise latch member 201 which is pivotably connected to a pair of opposing arm members 202 by pivot connection 203. Pivot connection 203 can be a pin (e.g. roll pin), bolt, or other shaft-forming body, for example. FIG. 12 shows latch member 201 in a locking configuration wherein bottom surface 204 of latch member 201 is below the plane of the bottom surface of arm members 202 such that securing surface 205 of latch member 201 is exposed. Latch member 201 is held in the locking configuration under tension by spring 206 such that latch member stop 207 is held against arm member stop 208. Spring 206 is connected to latch member 201 and arm members 202 by spring connections 209 which can be pins (e.g. roll pins), shafts, bolts, or other shaft-forming body, for example.

FIGS. 13 and 14 show latch 200 in a retracted configuration wherein latch member 201 has pivoted upward about pivot connection 203 so that bottom surface 204 is flush with the bottom surface of arm members 202 and securing surface 205 occupies the space between arm members 202. Latch 200 connects to the inside surface of hatch 104 near the bottom of the hatch by connecting surface 210. Latch 200 can be connected to hatch 104 using fasteners which are threaded through one or more fastener holes 211. Latch 200 can be connected to hatch 104 by fasteners such as screws, rivets, or bolts, for example. Alternatively, latch 200 can connect to hatch 104 by fixing connecting surface 210 to the inside surface of hatch 104 by welding or an adhesive, for example.

With camper 100 attached to a truck and the tailgate of the truck closed, the hatch securing system secures hatch 104 in a closed configuration by moving hatch 104 towards the tailgate from an open configuration such that bottom surface 204 of latch member 201 contacts the top surface of the tailgate. Pressing hatch 104 closed causes the tailgate to push against bottom surface 204 such that latch 200 assumes the retracted configuration wherein at least a portion of latch member 201 retreats into the space between arm members 202 until bottom surface 204 clears the top surface of the tailgate. After bottom surface 204 clears the tailgate, latch member 201 returns to the locking configuration under the tension of spring 206 such that securing surface 205 of latch member 201 contacts the inside surface of the tailgate thereby securing hatch 104 in a closed configuration. Hatch 104 can be opened by opening the tailgate of the truck so that latch 200 is disengaged from the tailgate thereby permitting hatch 104 to be opened.

It will be appreciated that latch 200 can be offered to consumers as an integral portion of a camper, or as a stand-alone unit for installation on a camper. Latch 200 may be offered to consumers as an assembled unit, or as a kit comprising at least a portion of the individual components of latch 200. The assembled unit and kit can be packaged and provided to consumers with instructions on the installation and use of latch 200.

While the latching system and hatch securing system of the invention are disclosed as being used in connection with a camper wherein the roof 103 is in a hinged relationship with sidewalls 101 and/or front wall 102, it will be understood that the latching system and hatch securing system of the invention can be used in connection with a canopy or "truck top" that is adapted to connect to a truck bed. Such a canopy can be that of the camper depicted in FIG. 3, wherein the canopy comprises sidewalls 101, front wall 102, and roof 103, wherein these components are fixed to one another or are made of a single, continuous construction. In such an embodiment, the canopy can comprise sidewalls 101, front wall 102, and roof 103, wherein roof 103 is not connected to sidewalls 101 and/or front wall 102 by hinges. The canopy body can be made from a material, including, without limitation, epoxy, a metal alloy or metal (e.g. aluminum or steel), fiberglass, carbon fiber, or combinations thereof. In one non-limiting embodiment, the canopy body is made from carbon fiber and the outer surface of the canopy body has attached thereto a skin of stainless steel.

REFERENCE CHARACTERS

100—Camper
101—Sidewalls
102—Front Wall
103—Roof
104—Hatch
105—Tent
106—Panel
107—Panel Door
108—Closure
109—Rams
110—Lockout Bars
111—Structural Elements
112—Structural Elements
113—Linear Members
114—Hatch Openings
115—Sidewall Openings
116—Latch Columns
117—Tailgate Mechanism
118—Bottom Support
119—Retention Members
120—Roof Latch 121—Latch Surface
201—Latch Member
202—Arm Members
203—Pivot Connection
204—Bottom Surface
205—Securing Surface
206—Spring
207—Latch Member Stop
208—Arm Member Stop
209—Spring Connections
210—Connecting Surface
211—Fastener Holes
212—Column Floorplate
213—Floorplate Opening

The invention claimed is:

1. A camper and strut system, comprising:
a camper having:
a) a roof having a first structural element and a second structural element; and
b) a first sidewall having third structural element and a second sidewall having a fourth structural element;
wherein (i) the first structural element is adapted to interface with the third structural element, (ii) the second structural element is adapted to interface with the fourth structural element, and (iii) interfacing of the first structural element with third structural element and interfacing of the second structural element with the fourth structural element provides the camper with a strut system that reinforces the roof, the first sidewall and the second sidewall against torsion forces when the camper is in a closed configuration;
wherein the first sidewall and the second sidewall (iv) each have a bottom that is adapted to mate with bedrails of a bed of a truck, and (v) form opposing planar structures that intervene between the roof and the bedrails of the truck when the camper is installed on the truck and the roof is in a closed position;
wherein (vi) the first structural element and the second structural element each include at least one of a first protrusion that extends beyond a plane of a bottom of the roof and a first indentation that forms a depression in the bottom of the roof; (vii) the third structural element at least one of a second protrusion and a second indentation each on a top of the first sidewall, and (viii) the fourth structural element is at least one of a third protrusion and a third indentation each on a top of the second sidewall.

2. The camper and strut system of claim 1, wherein the first structural element and the second structural element are on opposing sides of the roof.

3. The camper and strut system of claim 1, wherein the camper is adapted to assume an open configuration and a closed configuration.

4. The camper and strut system of claim 1, wherein the roof is connected to a hinge that is adapted to permit the camper to alternate between an open configuration and a closed configuration.

5. The camper and strut system of claim 1, wherein the roof contacts the first sidewall and the second sidewall when the camper is in a closed configuration.

6. The camper and strut system of claim 1, wherein the first sidewall and the second sidewall have a front end and a rear end, and the first sidewall and the second sidewall are not connected to one another on their rear end when the camper is in an open configuration.

7. The camper and strut system of claim 1, further comprising a tent connected to the roof, the first sidewall and the second sidewall.

8. The camper and strut system of claim 1, further comprising a hatch that is connected to the roof by at least one hinge.

9. A camper and latching system, comprising:
a camper comprising:
a) a roof;
b) a first sidewall and a second sidewall, wherein the first sidewall and the second sidewall are separated by a space; and
c) a hatch that is adapted to cover the space when the hatch is in a closed configuration;
wherein at least one of the first sidewall and the second sidewall have a sidewall opening;
wherein the sidewall opening is adapted to align with a hatch opening in the hatch when the hatch is in a closed configuration;
wherein the sidewall opening and the hatch opening are adapted to provide access to a mechanism for opening a tailgate of a truck when the camper is attached to a bed of the truck.

10. The camper and latching system of claim 9, wherein the mechanism is a latch or a switch.

11. The camper and latching system of claim 9, wherein the sidewall opening and the hatch opening are adapted to receive a foot of a human when the hatch is in a closed configuration.

* * * * *